(12) United States Patent
Kim et al.

(10) Patent No.: US 12,554,632 B2
(45) Date of Patent: Feb. 17, 2026

(54) ELECTRONIC DEVICE AND METHOD WITH HARDWARE ACCELERATION

(71) Applicants: SAMSUNG ELECTRONICS CO., LTD., Suwon-si (KR); UIF (University Industry Foundation), Yonsei University, Seoul (KR)

(72) Inventors: Bongjun Kim, Suwon-si (KR); Youngsok Kim, Seoul (KR); Sangsu Lee, Seoul (KR); Jounghoo Lee, Seoul (KR); Yeonan Ha, Seoul (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/670,075

(22) Filed: May 21, 2024

(65) Prior Publication Data

US 2025/0045196 A1    Feb. 6, 2025

(30) Foreign Application Priority Data

Aug. 1, 2023   (KR) ........................ 10-2023-0100649

(51) Int. Cl.
     *G06F 12/02*      (2006.01)
(52) U.S. Cl.
     CPC .............................. *G06F 12/0223* (2013.01)
(58) Field of Classification Search
     CPC .................................................. G06F 12/0223
     See application file for complete search history.

(56) References Cited

U.S. PATENT DOCUMENTS

| | | |
|---|---|---|
| 11,468,001 B1 | 10/2022 | Hassaan et al. |
| 2018/0336025 A1 | 11/2018 | Choi et al. |
| | (Continued) | |

FOREIGN PATENT DOCUMENTS

| | | |
|---|---|---|
| KR | 10-1814577 B1 | 1/2018 |
| KR | 10-2289095 B1 | 8/2021 |
| | (Continued) | |

OTHER PUBLICATIONS

Jeon, Won, et al. "PIMCaffe: Functional evaluation of a machine learning framework for in-memory neural processing unit." IEEE Access 9, Jul. 14, 2021. (pp. 96629-96640). (Year: 2021).*

(Continued)

*Primary Examiner* — Kaushikkumar M Patel
*Assistant Examiner* — Christian Joseph O'Connell
(74) *Attorney, Agent, or Firm* — NSIP Law (57) ABSTRACT

An electronic device and method are provided. The method includes, in response to a result of a performed determination, between a processing-in-memory (PIM) operation and a non-PIM operation, being that a target operation included in an instruction set is the PIM operation, loading information regarding a PIM operation type of the target operation to a PIM operation register of an accelerator of the electronic device based on a performed determination that input data, for use in the target operation, is arranged in a memory of the accelerator according to a characteristic of the target operation, and controlling, using a PIM operation execution instruction, one or more PIM processing elements (PEs) of the memory to perform the target operation using the arranged input data and the information regarding the operation type loaded in the PIM operation register.

20 Claims, 7 Drawing Sheets

(56) References Cited

U.S. PATENT DOCUMENTS

| | | | |
|---|---|---|---|
| 2019/0114265 A1* | 4/2019 | Chang | G06F 13/1689 |
| 2021/0056029 A1* | 2/2021 | Sharovar | G06F 12/0893 |
| 2021/0150311 A1* | 5/2021 | Zhou | G06N 3/084 |

FOREIGN PATENT DOCUMENTS

| | | |
|---|---|---|
| KR | 10-2022-0074684 A | 6/2022 |
| WO | WO 2022/047802 A1 | 3/2022 |

OTHER PUBLICATIONS

Ahn, Junwhan, et al. "PIM-enabled instructions: A low-overhead, locality-aware processing-in-memory architecture." ACM SIGARCH Computer Architecture News 43.3S. Jun. 13-17, 2015 (pp. 336-348).

Fowers, Jeremy, et al. "A configurable cloud-scale DNN processor for real-time AI." 2018 ACM/IEEE 45th Annual International Symposium on Computer Architecture (ISCA). IEEE, 2018 (pp. 1-14).

Jeon, Won, et al. "PIMCaffe: Functional evaluation of a machine learning framework for in-memory neural processing unit." IEEE Access 9, Jul. 14, 2021. (pp. 96629-96640).

Kim, Chang Hyun, et al. "Silent-PIM: Realizing the processing-in-memory computing with standard memory requests." IEEE Transactions on Parallel and Distributed Systems 33.2, Feb. 2022 (pp. 251-262).

Lee, Won Jun, et al. "PISA-DMA: Processing-in-Memory Instruction Set Architecture Using DMA." IEEE Access 11, Jan. 27, 2023 (pp. 8622-8632).

Liu, Shaoli, et al. "Cambricon: An instruction set architecture for neural networks." ACM SIGARCH Computer Architecture News 44.3, 2016 (pp. 393-405).

\* cited by examiner

ELECTRONIC DEVICE AND METHOD WITH HARDWARE ACCELERATION

CROSS-REFERENCE TO RELATED APPLICATIONS

This application claims the benefit under 35 USC § 119(a) of Korean Patent Application No. 10-2023-0100649, filed on Aug. 1, 2023, in the Korean Intellectual Property Office, the entire disclosure of which is incorporated herein by reference for all purposes.

BACKGROUND

1. Field

The following description relates to an accelerator, an electronic device including the accelerator, and a method of operating the electronic device.

2. Description of Related Art

Accelerators are hardware processing devices designed to perform predetermined tasks quickly in a computing environment. Accelerators are typically more efficient at performing such predetermined tasks than a host processor of an electronic device. For example, an accelerator may operate independently of the host processor and may be optimized to process one or more of such predetermined tasks. Various types of accelerators exist, with the most commonly known accelerator being a graphics processing unit (GPU). For example, a GPU may be an accelerator for graphics-related tasks. As a non-limiting example, artificial intelligence and machine learning operations may be performed using a neural processing unit (NPU) specialized for neural network processing may be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes, in response to a result of a performed determination, between a processing-in-memory (PIM) operation and a non-PIM operation, being that a target operation included in an instruction set is the PIM operation, loading information regarding a PIM operation type of the target operation to a PIM operation register of an accelerator of the electronic device based on a performed determination that input data, for use in the target operation, is arranged in a memory of the accelerator according to a characteristic of the target operation, and controlling, using a PIM operation execution instruction, one or more PIM processing elements (PEs) of the memory to perform the target operation using the arranged input data and the information regarding the operation type loaded in the PIM operation register.

The controlling may include controlling the PIM operation to be performed in a portion of a plurality of memory banks included in the memory based on a bit field of the PIM operation execution instruction.

The controlling may include controlling the one or more PIM PEs in at least a portion of the memory to perform the PIM operation and restricting access to the at least portion of the memory by an arbitrary instruction, also included in the instruction set, while the one or more PIM PEs are performing the PIM operation.

The controlling may further include storing a status of the PIM operation in the PIM operation register, where the status of the PIM operation may include status information that the PIM operation is being performed when the PIM operation is being performed, and status information that the PIM operation has terminated when the PIM operation has terminated, and where the status information that the PIM operation has been terminated may include status information regarding whether the PIM operation was successful.

The method may further include identifying the status of the PIM operation stored in the PIM operation register, and determining, based on the identified status of the PIM operation, whether a result obtained through the PIM operation is to be excluded or whether a post-processing is necessary for the result obtained through the PIM operation.

The method may further include, in response to a determination that the input data is firstly arranged not according to the characteristics of the target operation, rearranging the input data according to the characteristic of the PIM operation using a load/store instruction to access the memory.

The instruction set may include the PIM operation execution instruction.

The method may further include rearranging, according to a predetermined arrangement compatible with one or more other components of the accelerator, a result of the PIM operation using a load/store instruction to access the memory.

In one general aspect, a non-transitory computer-readable storage medium stores instructions that, when executed by one or more processors, cause the one or more processors to perform one or more or all operations or methods described herein.

In one general aspect, an electronic device includes an accelerator including a memory including processing-in-memory (PIM) processing elements (PEs) respectively configured to perform a PIM operation, a PIM operation register, and one or more processors, separate from the memory, configured to, in response to a result of a performed determination, between the PIM operation and a non-PIM operation, being that a target operation included in an instruction set is the PIM operation, load information regarding a PIM operation type of the target operation to the PIM operation register based on a performed determination that input data, for use in the target operation, is arranged in the memory according to a characteristic of the target operation, and control, using a PIM operation execution instruction, one or more of the PIM PEs to perform the target operation using the arranged input data and the information regarding the operation type loaded in the PIM operation register.

The electronic device may further include a host processor configured to control the electronic device and control the accelerator using the instruction set.

The one or more processors may be configured to control the PIM operation to be performed in a portion of a plurality of memory banks included in the memory based on a bit field of the PIM operation execution instruction.

The one or more processors may be configured to control the one or more PE PIMs in at least a portion of the memory to perform the PIM operation and restrict access to the at least portion of the memory by an arbitrary instruction, also included in the instruction set, while the one or more PE PIMs may be performing the PIM operation.

The one or more processors may be further configured to control a storing of a status of the PIM operation in the PIM operation register, where the status of the PIM operation may include status information that the PIM operation is being performed when the PIM operation is being performed, and status information that the PIM operation has terminated when the PIM operation has terminated, and where the status information that the PIM operation has been terminated may include status information regarding whether the PIM operation was successful.

The one or more processors may be further configured to identify the status of the PIM operation stored in the PIM operation register, and determine, based on the identified status of the PIM operation, whether a result obtained through the PIM operation is to be excluded or whether a post-processing is necessary for the result obtained through the PIM operation.

The one or more processors may be further configured to, in response to a determination that the input data is firstly arranged not according to the characteristics of the target operation, rearrange the input data according to the characteristic of the PIM operation using a load/store instruction to access the memory.

The instruction set may include the PIM operation execution instruction.

The one or more processors may be further configured to rearrange, according to a predetermined arrangement compatible with one or more other components of the accelerator, a result of the PIM operation using a load/store instruction to access the memory.

The PIM operation type may be a multiplication operation type.

The characteristic may be information that indicates whether the control of the one or more of the PIM PEs is to perform the target operation in parallel or serially.

In one general aspect, an electronic device includes an accelerator that includes a memory including processing-in-memory (PIM) processing elements (PEs) respectively configured to perform a PIM operation, one or more processors, separate from the memory, configured to in response to a result of a performed determination, between the PIM operation and a non-PIM operation, being that a target operation included in an instruction set is the PIM operation, obtain information regarding a PIM operation type of the target operation based on a performed determination that input data, for use in the target operation, is arranged according to a characteristic of the target operation, and control, using a PIM operation execution instruction, one or more of the PIM PEs to perform the target operation using the arranged input data and the obtained information regarding the operation type.

Other features and aspects will be apparent from the following detailed description, the drawings, and the claims.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application and are not to be interpreted in an idealized or overly formal sense unless expressly so defined herein.

Figure 1:
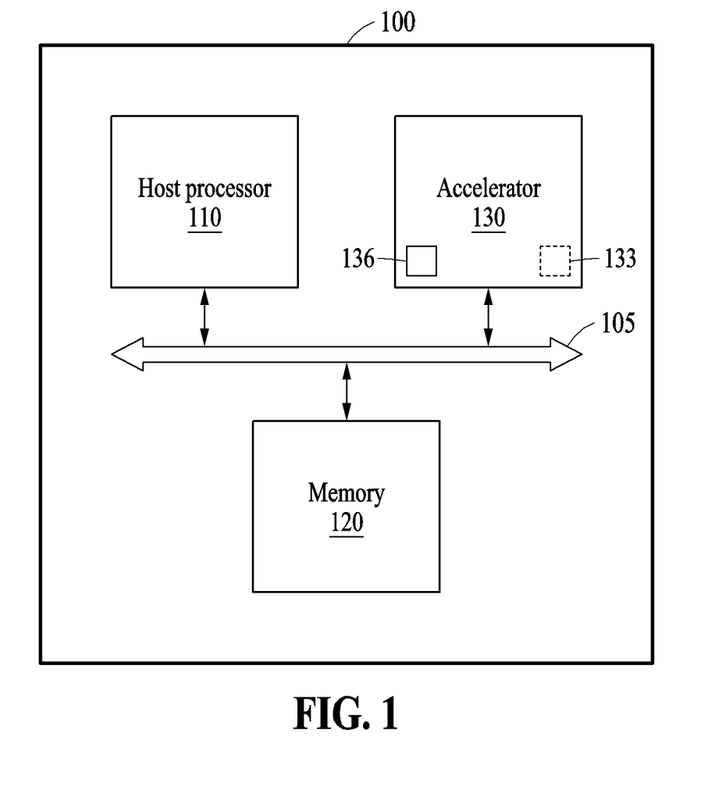
FIG. 1 illustrates an example electronic device, according to one or more embodiments.

FIG. 1 illustrates an example electronic device, according to one or more embodiments.

Referring to FIG. 1, an electronic device (or system) 100 may include a host processor 110, a memory 120, and an accelerator 130. The host processor 110, the memory 120, and the accelerator 130 may communicate with each other through a communication system hardware (represented by reference number 105) that may include any one or any combination of a bus, a network on a chip (NoC), a peripheral component interconnect express (PCIe), and the like. The communication system hardware may also be configured to perform communication between the electronic device 100 and one or more exterior electronic devices. The electronic device 100 may include other general-purpose components in addition to the host processor 110, memory 120, accelerator 130, and the communication system hardware 105.

In an example, the host processor 110 may perform operations that control an overall operation of the electronic device 100. For example, the host processor 110 may generally control the electronic device 100 by executing computer-readable instructions (e.g., of firmware, programs, and/or applications) stored in the memory 120. As non-limiting examples, the host processor 110 may represent any one or any combination of a central processing unit (CPU), a graphics processing unit (GPU), an application processor (AP), and the like, as well as one or more processors respectively of the CPU, the GPU, the AP, and the like; however, examples are not limited thereto.

The memory 120 is hardware configured to store data (e.g., data that will be, is, or has been input, generated, processed, and/or output by the electronic device 100, as non-limiting examples, such as by the host processor 110 and/or the accelerator 130). For example, the memory 120 may store firmware, programs, applications, drivers, and the like to be executed by the electronic device 100. The memory 120 may include a volatile memory (e.g., dynamic random-access memory (DRAM)) and/or a nonvolatile memory. The memory 120 is representative of any one or any combination of the memories disposed throughout the electronic device 100. For example, the memory 120 may be representative of one or more memories within or directly connected (and/or connected through the communication system hardware 105) to the host processor 130.

The accelerator 130 may process tasks more efficiently by one or more processors of the accelerator 130, compared to the one or more processors of the CPU, the GPU, the AP, and the like. For example, the one or more processors of the accelerator 130 may perform AI and/or machine learning operations (e.g., of one or more neural networks or one or more layers of such one or more neural networks) more efficiently (e.g., more accurately, faster and/or with less power requirements, as non-limiting examples) than a performance of such AI and/or machine learning operations by the host processor 110, due to hardware and operation characteristics of the accelerator 130. The one or more processors of the accelerator 130 include one or more processing elements (PEs) (e.g., one or more processors 133 and respective processing-in-memory (PIM) PEs in a separate memory 136 that is separate from the memory 120) may be utilized to perform the AI and/or machine learning operations. The accelerator 130 may be, for example, a neural processing unit (NPU), a tensor processing unit (TPU), a digital signal processor (DSP), the GPU, a neural engine, and the like that may perform the AI and/or machine learning operations. As noted, the machine learning operations may include neural network operations.

An instruction set architecture (ISA) of the accelerator 130 may be different from an ISA of the host processor 110. For example, the ISA of the host processor 110 may include general-purpose instructions or other instructions for other functions of the electronic device 100. However, the ISA of the accelerator 130 may include instructions optimized for a predetermined task of one or more predetermined tasks the accelerator 130 is configured to perform. Thus, the accelerator 130 may efficiently operate for such predetermined tasks. For example, an ISA of the NPU may include instructions to accelerate machine learning tasks, as well as other AI tasks.

The separate memory 136 is also representative of memory storage portions of the separate memory 136 and the PIM PEs. When the accelerator 130 includes the separate memory, the amount of time used by the accelerator 130 to read and write data may be reduced, and the overall performance of the accelerator 130 may be enhanced compared to the performance of such AI and/or machine learning operations by the host processor 110. The PIM PEs of the separate memory 136 of the accelerator 130 are different processors than any other processors 133 of the accelerator 130 that perform other respective processing operations. The PIM PEs may be configured to perform operations of AI and/or machine learning models (e.g., stored in the memory 120 of the accelerator 130 and/or one or more other memories 120 of the electronic device 100) that, when implemented, perform PIM operations of the AI or machine learning tasks to further increase an operation speed. An ISA for the accelerator 130 may include an instruction that controls/causes one or more PIM PEs of the memory 136 to perform a corresponding PIM operation of the AI or machine learning tasks.

Only for convenience of explanation, hereinafter, examples of the accelerator 130, which include such PIM PEs respectively in one or more of the separate memories 136 of the accelerator 130, may be referred to as an NPU, and the PIM PEs of the accelerator 130 may be referred to as a PIM, PIM PE, PE, or the like that are configured to perform a PIM operation. Various other types of accelerators that include such PIMs, PIM PEs, or PE elements configured to perform the PIM operation are also available, and thus, the below examples and claims are not limited to the same.

Figure 2:
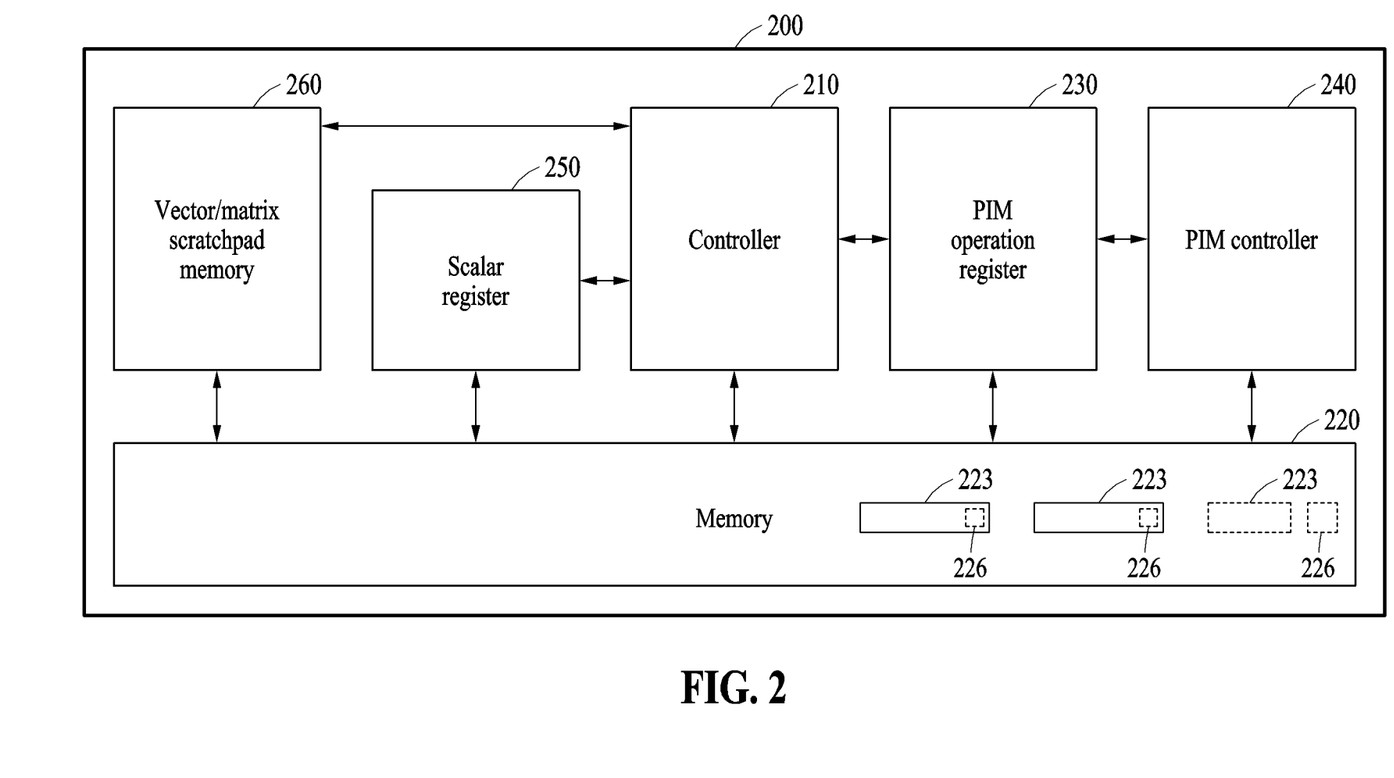
FIG. 2 illustrates an example accelerator, according to one or more embodiments.

FIG. 2 illustrates an example accelerator, according to one or more embodiments.

Referring to FIG. 2, an NPU 200 may include a controller 210, a memory 220, a PIM operation register 230, a PIM controller 240, a scalar register 250, and a vector/matrix scratchpad memory 260. The memory 220 represents PIM PEs of the memory 220 that are configured to perform respective PIM operations. In an example, the memory 220 is also representative of storage elements that store information that may be read from and stored to, respectively with respect to devices exterior of the memory 220 and between the storage elements and the PIM PEs within the memory 220. In an example, the NPU 200 may additionally include the PIM operation register 230 and the PIM controller 240. For example, the PIM operation register 230 may be connected to the PIM controller 240, which may be configured to control the PIM operation register 230.

The controller 210 may include one or more processors and/or other circuitry configured to execute a binary code that represents instructions included in an ISA of the NPU 200. In an example, the binary code, which is an NPU code, may be a code in which instructions for the NPU 200 are serially written in the received ISA. The controller 210 may read such serially written instructions and perform target operations corresponding to the instructions. Accordingly, a plurality of target operations may be performed serially, according to the binary code, performed through control by the controller 210.

The controller 210 may read an instruction included in the binary code and perform or control a target operation to be performed related to the instruction. Here, for the performance of the target operation, the controller 210 may spontaneously perform the target operation or may control another component of the NPU 200 to perform the target operation.

In other words, the controller 210 may read an instruction and perform a target operation according to the instruction. According to the instruction, the controller 210 may also control other components (e.g., the memory 220) to perform a target operation. For example, the controller 210 may control the memory 220 to perform a PIM operation when the target operation includes the PIM operation.

Before the controlling of the memory 220 to perform the PIM operation, the controller 210 may determine information on an operation type of the PIM operation, and provide the determined information to the PIM operation register 230. The memory 220 may then be controlled to perform the PIM operation based on the information on the operation type of the PIM operation provided to the PIM operation register 230. For example, a PIM PE within the memory 220 may perform a hardware (e.g., circuitry)-performed multiplication computation operation (hereinafter referred to as a multiplication operation) based on the information provided to the PIM operation register 230 indicating the multiplication operation. As a non-limiting example, the memory 220 may include a plurality of memory banks 223 and PIM PEs 226.

The PIM operation register 230, which is a register used for a PIM operation may be different from the scalar register 250 and other non-PIM operation registers of the NPU 200. When the PIM operation is terminated, the controller 210 may read a result of the PIM operation using load/store instructions.

When the target operation includes a general arithmetic computation operation (hereinafter referred to as a non-PIM arithmetic operation) instead of the PIM operation, the controller 210 may read an operand from the vector/matrix scratchpad memory 260 and/or the scalar register 250, perform the non-PIM arithmetic operation, and may write a result of the performed the non-PIM arithmetic operation to the vector/matrix scratchpad memory 260 and/or the scalar register 250. Thus, in an example, the PIM operation register 230 may be used for a PIM operation only, and the vector/matrix scratchpad memory 260 and the scalar register 250 may be used for operations other than the PIM operation. Said another way, the PIM operation register 230 may not be used to perform a non-PIM operation, and the vector/matrix scratchpad memory 260 and the scalar register 250 may not be used to perform the PIM operation. Thus, a function performed by or using the PIM operation register 230 may be different from functions performed by the vector/matrix scratchpad memory 260 and the scalar register 250.

In addition, the controller 210 may fetch data into the vector/matrix scratchpad memory 260 and/or the scalar register 250 using load/store instructions, without a separate operation.

The vector/matrix scratchpad memory 260 may store data regardless of whether the types of data are vectors or matrices. For example, a vector stored in the vector/matrix scratchpad memory 260 may be used in a matrix operation by the controller 210, and a result matrix of the matrix operation may also be stored in units of vectors in the vector/matrix scratchpad memory 260. In an example, the vector/matrix scratchpad memory 260 may be representative of a vector scratchpad memory and a separate matrix scratchpad memory (e.g., in the vector/matrix scratchpad memory 260 or merely as respective separate memories of the NPU 200).

The controller 210 may also be representative of a separate PIM load/store controller (e.g., other processor or other circuitry) to execute the PIM operation execution instruction through control of PIM PEs of the memory 220 and, and/or may be representative of a separate general load/store controller (e.g., other processor or other circuitry) that fetches data into the vector/matrix scratchpad memory 260 and/or the scalar register 250. When the NPU 200 includes the separate PIM load/store controller, a PIM operation execution instruction may be executed through the separate PIM load/store controller to operate the PIM operation execution instruction in a different path from those of other non-PIM memory instructions. For example, the PIM load/store controller may execute the PIM operation execution instruction independent of a performance of the non-PIM operation instruction execution by the general load/store controller. Therefore, the PIM operation execution instruction may operate asynchronously with other non-PIM execution instructions without data dependency therebetween.

While the controller 210, memory 220, PIM operation register 230, PIM controller 240, vector/matrix scratchpad memory 260, and scalar register 250 of the NPU 200 have been discussed, examples are not limited thereto, and the NPU 200 may further include other general purpose components in addition to the controller 210, memory 220, PIM operation register 230, PIM controller 240, vector/matrix scratchpad memory 260, and scalar register 250.

Figure 3:
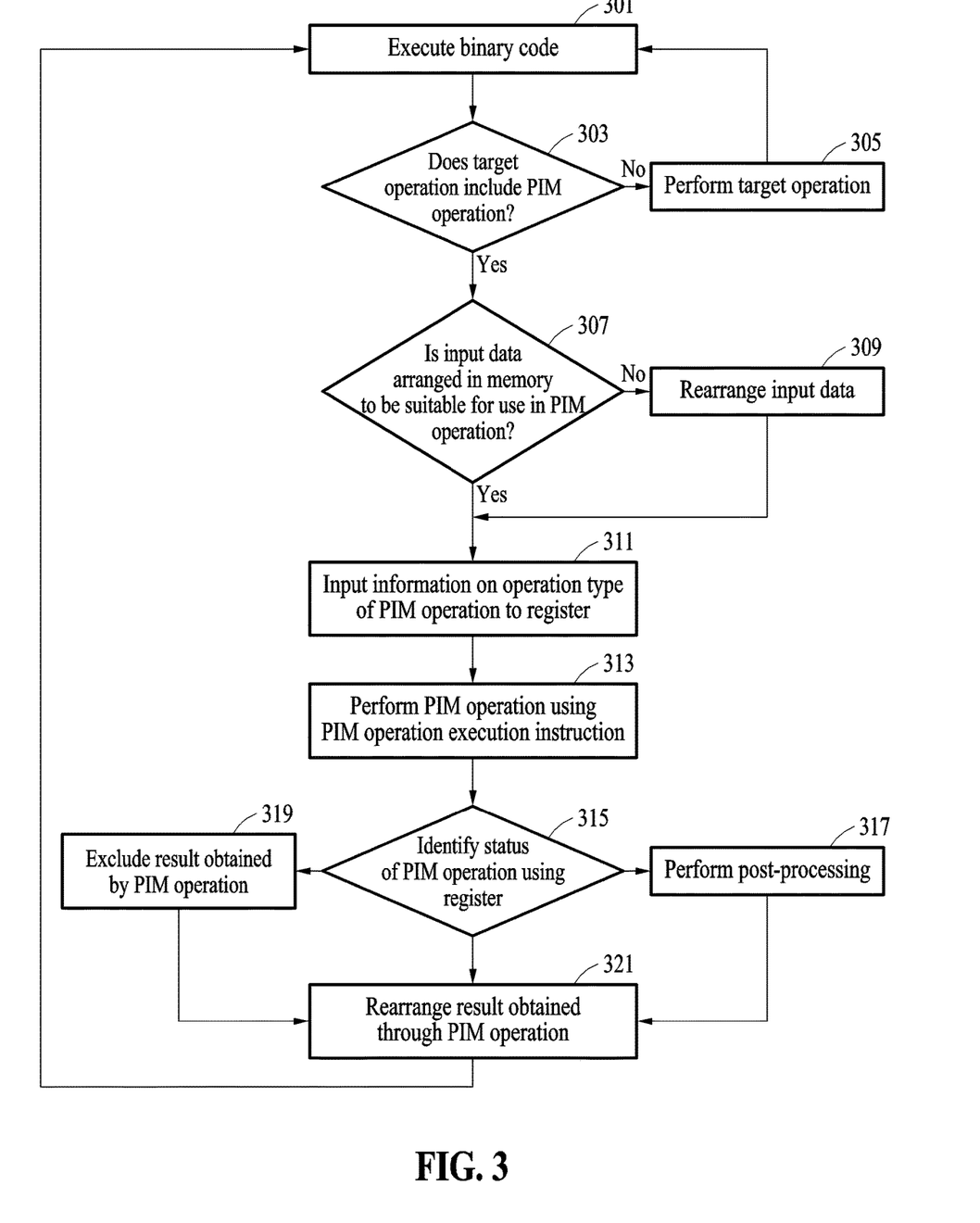
FIG. 3 illustrates example operations of an accelerator, according to one or more embodiments.

FIG. 3 illustrates example operations of an accelerator, according to one or more embodiments.

The example operations of FIG. 3 may be performed sequentially, but are not necessarily performed sequentially. For example, the order of the operations may be changed and at least two operations may be performed in parallel. In an example, the operations of FIG. 3 may be performed by the NPU 200 of FIG. 2, though examples are not limited thereto.

In operation 301, the accelerator may execute a binary code.

The binary code may be a code in which a plurality of instructions are serially written. Accordingly, by executing the binary code, the accelerator may perform a plurality of target operations corresponding to the plurality of instructions. The accelerator may sequentially perform the plurality of target operations.

For example, the accelerator may perform a first target operation, a second target operation, and a third target operation by executing the binary code. The accelerator may sequentially perform the first target operation, the second target operation, and the third target operation in order.

In operation 303, the accelerator may determine whether the target operation includes a PIM operation.

In an example, when a result of the determination of operation 303 is that the target operation does not include the PIM operation, i.e., the target operation is a non-PIM operation, operation 305 may be performed. In operation 305, the accelerator may perform the non-PIM target operation. For example, when the target operation does not include the PIM operation, that is, when the target operation includes a general operation only, a controller (e.g., one or more processors or other circuitry) may perform the target operation. As a non-limiting example, the controller may correspond to the controller 210 of FIG. 2. In this example, when operation 305 has completed, e.g., a result of the target operation has been performed and a result of the target operation has been generated, the target operation may be terminated, and a next target operation may be performed.

In another example, when a result of operation 303 is that the target operation is determined to include the PIM operation, operation 307 may be performed. For example, the accelerator may prepare to perform the PIM operation.

For example, a first instructed target operation may not include a PIM operation, and a subsequently instructed second target operation may include a PIM operation. Alternatively, the first instructed target operation may include the PIM operation, and the subsequently instructed second target operation may not include a PIM operation. Thus, as non-limiting examples, the accelerator may sequentially perform: multiple non-PIM target operations through a repetition of operation 305; a non-PIM target operation by operation 305 and a subsequent PIM target operation by operations beginning at operation 307; multiple PIM target operations by a repetition of operations beginning at operation 307; and a PIM target operation by operations beginning at operation 307 and a subsequent non-PIM target operation by operation 305. Accordingly, in the example where the first instructed target operation does not include the PIM operation, the controller may perform and terminate the first target operation. Subsequently, when the next instructed target operation is a PIM operation, operation 307 may be performed.

For the preparation of the PIM operation, in operation 307 the accelerator may determine whether input data for a PIM operation is arranged in a memory (e.g., the memory 136 of FIG. 1 or memory banks 223 of the memory 220 of FIG. 2) in a form that is predetermined to be suitable for use in the performance of the PIM operation.

For example, the accelerator may determine whether the input data is arranged in the memory according to a characteristic of the PIM operation. The memory that stores the input data may include a plurality of memory banks that operate independently. Each one memory bank of the plurality of memory banks may also be connected to a corresponding PIM PE, which may also be included in the one memory bank. The corresponding PIM PE of the one memory bank may perform a corresponding PIM operation using data stored in the one memory bank. In an example, for a more efficient performance of PIM operations, different PIM operations respectively performed by different memory banks may be performed simultaneously (i.e., in parallel) by a corresponding PIM PE of each of the multiple (e.g., some or all) different memory banks. To this end, for such simultaneous PIM operation performances, it may be desirable for the input data to be evenly arranged, i.e., distributed, in the multiple memory banks of the plurality of memory banks. For example, the characteristic of the PIM operation may be a characteristic for parallel operations of the memory banks that perform PIM operations. Another characteristic of the PIM operation may be a characteristic for serial operations of each of the memory banks that perform the PIM operation.

When input data stored in the memory is not respectively arranged in corresponding memory banks of the memory in the form predetermined to be suitable for the PIM operation, the accelerator may rearrange the input data between the corresponding memory banks in operation 309.

For example, when input data is initially concentrated in predetermined memory banks (e.g., the input data has been stored to the predetermined memory banks, such as through control of the controller), it may be difficult to perform PIM operations in parallel in respective memory banks when the concentrations of the input data in the predetermined memory banks are unevenly distributed.

Accordingly, when the characteristic of the PIM operation is the parallel operation and it is determined that the input data are not arranged in corresponding memory banks of the memory in the form predetermined to be suitable for the PIM operation, the accelerator may rearrange the input data according to characteristics of PIM operations, using a load/store instruction to access the memory banks in an instruction set for the accelerator. In other words, the accelerator may redistribute the input data in the memory banks to become, or toward being, evenly distributed between the memory banks using load/store instructions. Here, a load/store instruction may be an instruction to fetch data into a vector/matrix scratchpad memory or a scalar register for non-PIM operations without a separate operation as described above with reference to FIG. 2, the load/store instruction may also be used to rearrange input data according to characteristics of PIM operations.

For example, in the memory, even-numbered memory banks among the plurality of memory banks may be controlled to perform PIM operations in parallel, and odd-numbered memory banks among the plurality of memory banks may be controlled to perform PIM operations in parallel. In this example, when the input data is initially consecutively arranged in the plurality of memory banks, and parallel PIM operations are determined to be performed, the input data may be rearranged from an initial arrangement into respective pairs of first and second memory banks that are interleaved.

When the input data is arranged in the memory in the predetermined form suitable for use in an instructed PIM operation, the accelerator may input information to a PIM operation register indicating the operation type of the PIM operation in operation 311. Here, the PIM operation register may be a register used for (or configured to perform) a predetermined purpose, that is, a register for a PIM operation distinguished from other registers of the NPU 200. The operation type of the PIM operation may include, for example, logical operations such as AND, OR, and NOT, as well as arithmetic operations such as multiplication, subtraction, and addition, as non-limiting examples.

In operation 313, the accelerator may perform the PIM operation using a PIM operation execution instruction.

The PIM operation execution instruction may be an instruction that causes the memory to perform a PIM operation using input data. The PIM operation execution instruction may be an instruction that causes the memory to perform a PIM operation and may be included in the instruction set for the accelerator. The accelerator may control the memory to perform a PIM operation according to the information stored in the PIM operation register using the PIM operation execution instruction.

In other words, the memory may perform an operation according to the information stored in the PIM operation register, indicating the operation type, using the input data arranged (or rearranged) according to the characteristic of the PIM operation in accordance with the PIM operation execution instruction. An example PIM operation execution instruction will be further described with reference to FIG. 4.

The accelerator may further perform an operation of storing a status of the PIM operation in the PIM operation register. The status of the PIM operation may include a status in which the PIM operation is being performed and a different status in which the PIM operation is terminated. The status in which the PIM operation is terminated may include a status indicating whether the PIM operation has been successful.

In other words, the accelerator may further perform an operation of updating the status of the PIM operation to the PIM operation register from a previous performance status. For example, when the PIM operation is terminated, the accelerator may update the status in which the PIM operation is terminated to the PIM operation register. When the PIM operation is terminated, the accelerator may update the status indicating whether the PIM operation has been successful to the PIM operation register.

In operation 315, the accelerator may identify the status of the PIM operation using the status of the PIM operation stored in the PIM operation register.

Thus, the accelerator may identify the status of the PIM operation stored in the PIM operation register and perform an operation based on the status of the PIM operation. When the PIM operation is being performed, the accelerator may wait until the PIM operation is terminated. When the PIM operation is terminated and determined to have failed, the accelerator may exclude the result of the corresponding PIM PE that performed the PIM operation in operation 319.

Memory banks may operate independently, and it may be difficult to perform data communication between the memory banks. Accordingly, post-processing based on the result obtained through the PIM operation may be determined to be necessary. For example, when the PIM operation is terminated and determined to be successful and such post-processing is determined to be necessary, the accelerator may perform post-processing in operation 317 separate from the performance of the underlying PIM operation by the corresponding PIM PE.

When the PIM operation is terminated and determined to be successful and the post-processing is determined to not be necessary, the accelerator may rearrange the result of the PIM operation such that other components of the accelerator may use the result of the PIM operation in operation 321. Here, a load/store instruction to access the memory may be used.

As a result, when the target operation is a PIM operation, and the PIM operation has been performed by the corresponding PIM PE, the PIM operation may be terminated, and the accelerator may perform operation 301 for the next target operation.

Figure 4:
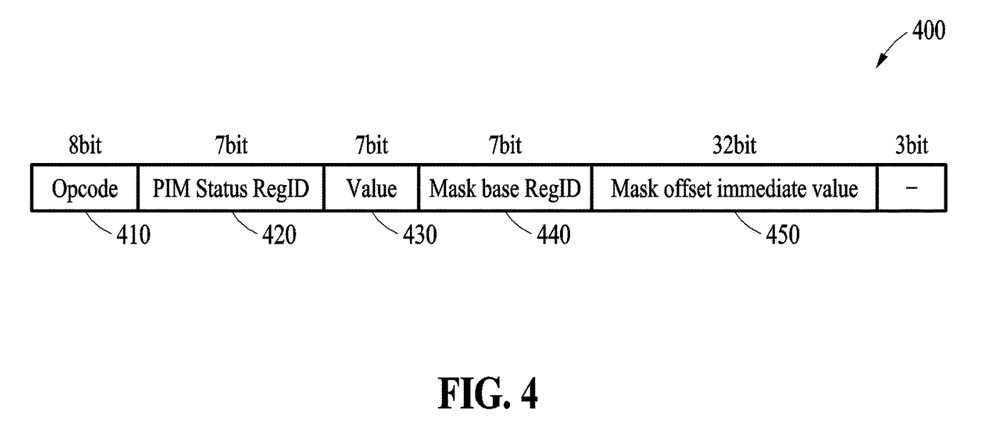
FIG. 4 illustrates an example processing-in-memory (PIM) operation execution instruction, according to one or more embodiments.

FIG. 4 illustrates an example an example processing-in-memory (PIM) operation execution instruction, according to one or more embodiments.

Referring to FIG. 4, a bit field 400 of the PIM operation execution instruction is shown.

The PIM operation execution instruction may have "64" bits in total, and may include opcode 410 of 8 bits, PIM Status RegID 420 of 7 bits, Value 430 of 7 bits, Mask Base RegID 440 of 7 bits, and Mask Offset Immediate Value 450 of 32 bits.

The opcode 410 may be an instruction code, and a controller (e.g., the controller 210 of FIG. 2) of an accelerator may identify the opcode 410 in the PIM operation execution instruction to determine whether an instruction is a PIM operation execution instruction or non-PIM operation execution instruction. In other words, bits of the opcode 410 may vary depending on instructions, and the controller may review the opcode 410 to determine whether an instruction is the PIM operation execution instruction or the non-PIM operation execution instruction.

The PIM Status RegID 420 may designate an address of a PIM operation register that stores a status of a PIM operation. For example, the PIM Status RegID 420 may designate an address of a PIM operation register (e.g., the PIP operation register 230 of FIG. 2) that stores an operation performance status in which the PIM operation is to be, or is being, performed, and may further store a termination status when the PIM operation is terminated.

The Value 430 may designate partial bits for an address of a memory space. The partial bits may be used to block access of other instructions (e.g., general load/store instructions, etc.) to a memory space (i.e., a memory bank) in which a corresponding PIM operation is being performed. For example, when the partial bits are identical to a value obtained by masking an address of a memory space to be accessed by another instruction with a mask, access to the memory space by the other instruction may be blocked.

The Mask Base RegID 440 and Mask Offset Immediate Value 450 may designate a range of memory banks to perform PIM operations. The Mask Base RegID 440 may designate a starting point of a memory bank that is to perform a PIM operation. The Mask Offset Immediate Value 450 may designate an end point of the memory bank. In other words, a memory may include a plurality of memory banks that may independently operate. Accordingly, the Mask Base RegID 440 and the Mask Offset Immediate Value 450 may designate which memory banks are to perform respective PIM operations among the plurality of memory banks.

Thus, the accelerator may control a PIM operation to be performed in a portion of the plurality of memory banks included in the memory based on a bit field of the PIM operation execution instruction.

In addition, the accelerator may restrict access to a memory bank that is performing a corresponding PIM operation according to the Mask Base RegID 440 and the Mask Offset Immediate Value 450. In other words, the accelerator may restrict access to the memory by an arbitrary instruction included in an instruction set for the accelerator while the memory is currently performing the corresponding PIM operation. For example, when an address included in a load/store instruction to access the memory matches an address of a memory bank that is performing the PIM operation, the accelerator may restrict access to the memory by the load/store instruction.

The PIM operation execution instruction may be included in an instruction set provided to an accelerator (e.g., from a host processor). The instruction set may include the PIM operation execution instruction and may support operations for various bit widths (e.g., 8 bits, 16 bits, and 32 bits) to support various different arithmetic precisions (e.g., depending on the manufacturer of the memory). In addition, in an example, with a vector scratchpad memory and a matrix scratchpad memory being integrated into a vector/matrix scratchpad memory, the instruction set for the accelerator may include a vector operation instruction and a matrix operation instruction for the vector/matrix scratchpad memory. Here, an input address and an output address of each of the vector operation instructions and the matrix operation instruction may be in a same memory space. The instruction set for the accelerator may include an arithmetic operation instruction that supports a transcendental function to support various neural network operations.

Figure 5:
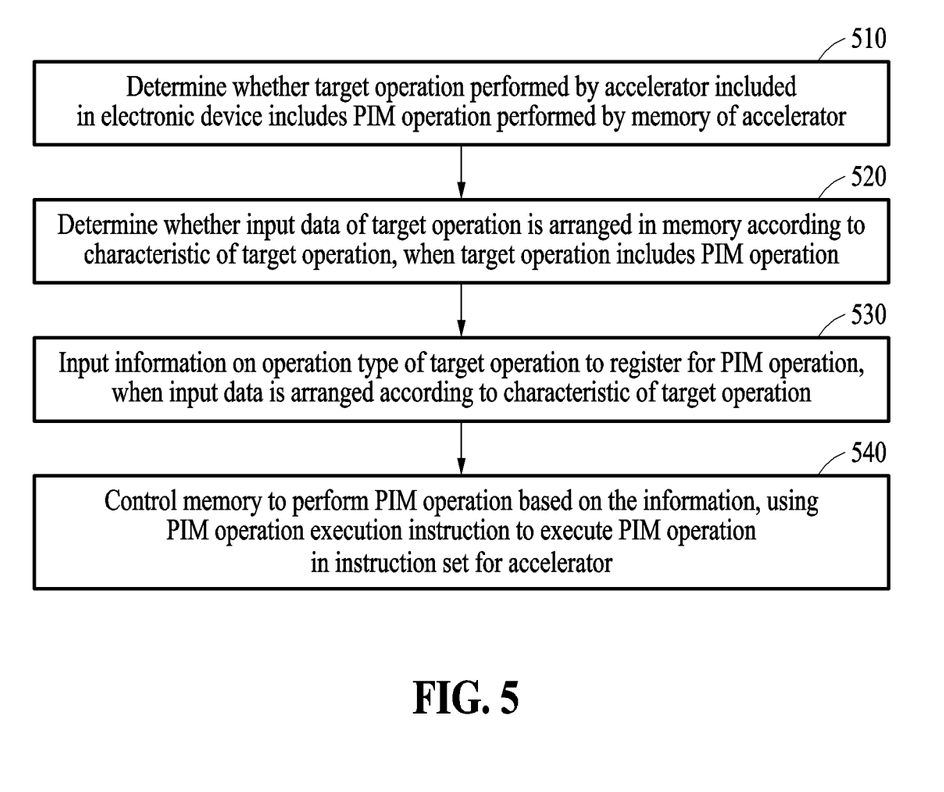
FIG. 5 illustrates example operations of an electronic device and accelerator, according to one or more embodiments.

FIG. 5 illustrates example operations of an electronic device and accelerator, according to one or more embodiments.

In the following examples, operations may be performed sequentially but are not necessarily performed sequentially. For example, the order of the operations may be changed, and at least two operations may be performed in parallel.

In operation 510, the electronic device may determine whether a target operation performed by an accelerator included in the electronic device includes a PIM operation to be performed by a memory of the accelerator.

In operation 520, the electronic device may determine whether input data of the target operation is arranged in the memory according to a characteristic of the target operation when the target operation includes the PIM operation.

In operation 530, the electronic device may input information on an operation type of the target operation to a PIM operation register for the PIM operation when the input data is arranged according to the characteristic of the target operation.

In operation 540, the electronic device may control the memory to perform the PIM operation based on the information, using a PIM operation execution instruction to execute the PIM operation in an instruction set for the accelerator.

The descriptions provided with reference to FIGS. 1 to 4 may apply to the operations shown in FIG. 5, and thus, a more detailed description thereof is omitted.

Figure 6:
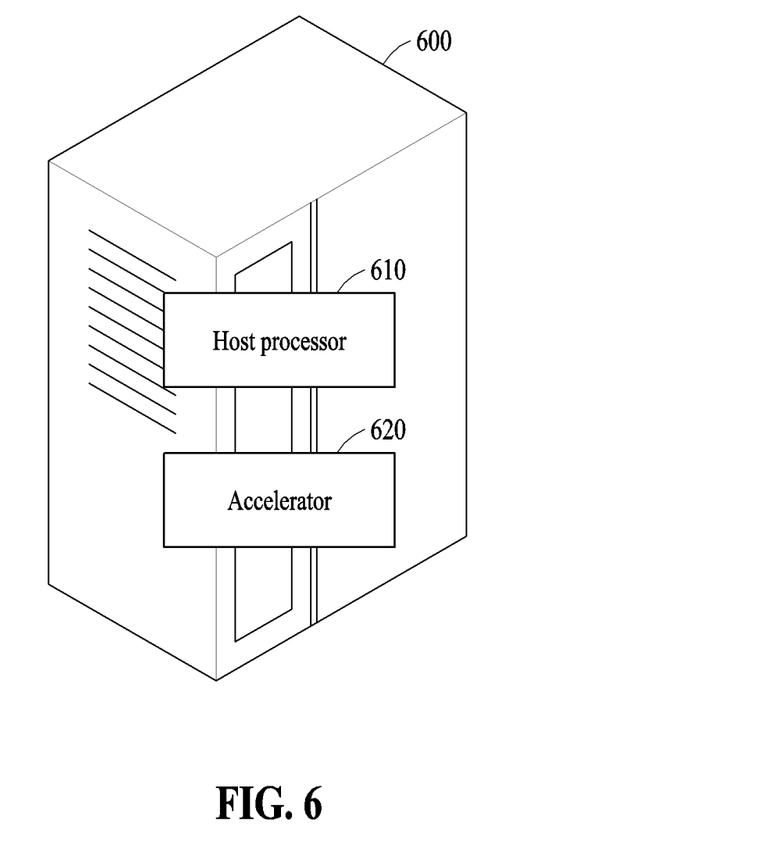
FIGS. 6 and 7 illustrate an example electronic device, according to one or more embodiments.
Figure 7:
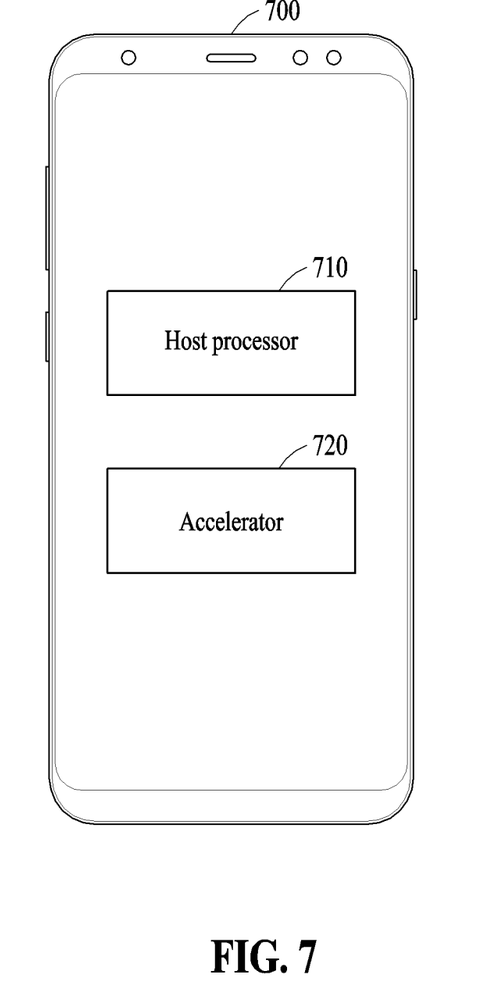

FIGS. 6 and 7 illustrate an example electronic device, according to one or more embodiments.

As a non-limiting example, the electronic device may correspond the electronic device 100 of FIG. 1, and may be a server 600 that may be a separate device than a user terminal controlled by a user and may communicate with at least one user terminal through a wired and/or wireless network. The server 600 may receive requests simultaneously transmitted by multiple users through their terminals. The server 600 may include a host processor 610 and an accelerator 620. The server 600 may perform a target operation using the accelerator 620, which includes a memory configured to perform PIM operations described above. When the target operation includes a PIM operation, the accelerator 620 may control the memory to perform the PIM operation according to a PIM operation execution instruction. In addition, the server 600 may return the results of the target operation to respectively corresponding user terminals. The user terminals may include, for example, various computing devices such as smartphones, personal computers (PCs), tablet PCs, and laptops, various wearable devices such as smart watches and smart eyeglasses, various home appliances such as smart speakers, smart televisions (TVs), and smart refrigerators, and other devices such as smart vehicles, smart kiosks, and Internet of things (IoT) devices. In an example, the server 600 and such a user terminal (e.g., such as the electronic device 700 of FIG. 7) that at least includes a host processor and user interface.

Referring to FIG. 7, the electronic device may be the user terminal 700. Although the user terminal 700 is illustrated as a smartphone in FIG. 7, this illustration is only for convenience of explanation. Thus, examples are not limited to the electronic device being the smartphone and the electronic device may be all devices controlled by a user without limitation. The user terminal 700 may include a host processor 710 and an accelerator 720. As a non-limiting example, the host processor 710 may correspond to the host processor 110 of FIG. 1, and the accelerator 720 may correspond to the accelerator 130 of FIG. 1 and/or the accelerator 200 of FIG. 2. The user terminal 700 may perform a target operation using the accelerator 720. When the target operation includes a PIM operation, the accelerator 720 may control a memory included in the accelerator 720 to perform the PIM operation.

The electronic devices, accelerators, host processors, communication systems, memory banks with PIM PEs, vector/matrix scratchpad memory, scalar register, controller, PIM operation register, PIM controller, user terminal, and server described herein, and related descriptions with respect to respect to FIGS. 1-7, as non-limiting examples, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more additional processors, or another processor and another controller. One or more processors, or a processor and a controller, may implement a single hardware component or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7, and discussed with respect to, FIGS. 1—that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method of operating an electronic device, the method comprising:
   in response to a result of a performed determination, between a processing-in-memory (PIM) operation and a non-PIM operation, being that a target operation included in an instruction set is the PIM operation:
      loading information regarding a PIM operation type of the target operation to a PIM operation register of an accelerator of the electronic device based on a performed determination that input data, for use in the target operation, is arranged in a memory of the accelerator according to a characteristic of the target operation; and
      controlling, using a PIM operation execution instruction, one or more PIM processing elements (PEs) of the memory to perform the target operation using the arranged input data and the information regarding the operation type loaded in the PIM operation register,
   wherein the controlling further comprises storing a status of the PIM operation in the PIM operation register.

2. The method of claim 1, wherein the controlling comprises controlling the PIM operation to be performed in a portion of a plurality of memory banks included in the memory based on a bit field of the PIM operation execution instruction.

3. The method of claim 1, wherein the controlling comprises controlling the one or more PIM PEs in at least a portion of the memory to perform the PIM operation and restricting access to the at least portion of the memory by an arbitrary instruction, also included in the instruction set, while the one or more PIM PEs are performing the PIM operation.

4. The method of claim 1, further comprising, in response to a determination that the input data is firstly arranged not according to the characteristics of the target operation, rearranging the input data according to the characteristic of the PIM operation using a load/store instruction to access the memory.

5. The method of claim 1, wherein the instruction set comprises the PIM operation execution instruction.

6. The method of claim 1, further comprising rearranging, according to a predetermined arrangement compatible with one or more other components of the accelerator, a result of the PIM operation using a load/store instruction to access the memory.

7. A non-transitory computer-readable storage medium storing instructions that, when executed by one or more processors, cause the one or more processors to perform the method of claim 1.

8. The method of claim 1,
   wherein the status of the PIM operation comprises status information that the PIM operation is being performed when the PIM operation is being performed, and status information that the PIM operation has terminated when the PIM operation has terminated, and
   wherein the status information that the PIM operation has been terminated comprises status information regarding whether the PIM operation was successful.

9. The method of claim 8, further comprising identifying the status of the PIM operation stored in the PIM operation register, and determining, based on the identified status of the PIM operation, whether a result obtained through the PIM operation is to be excluded or whether a post-processing is necessary for the result obtained through the PIM operation.

10. An electronic device comprising:
    an accelerator including:
       a memory including processing-in-memory (PIM) processing elements (PEs) respectively configured to perform a PIM operation;
       a PIM operation register; and
       one or more processors, separate from the memory, configured to:
          in response to a result of a performed determination, between the PIM operation and a non-PIM operation, being that a target operation included in an instruction set is the PIM operation:
             load information regarding a PIM operation type of the target operation to the PIM operation register based on a performed determination that input data, for use in the target operation, is arranged in the memory according to a characteristic of the target operation; and
             control, using a PIM operation execution instruction, one or more of the PIM PEs to perform the target operation using the arranged input data and the information regarding the operation type loaded in the PIM operation register,
          wherein the one or more processors are further configured to control a storing of a status of the PIM operation in the PIM operation register.

11. The electronic device of claim 10, wherein the PIM operation type is a multiplication operation type, and wherein the characteristic is information that indicates whether the one or more of the PIM PEs is to perform the target operation in parallel or serially.

12. The electronic device of claim 10, further comprising a host processor configured to control the electronic device and control the accelerator using the instruction set.

13. The electronic device of claim 12, wherein the one or more processors are configured to control the PIM operation to be performed in a portion of a plurality of memory banks included in the memory based on a bit field of the PIM operation execution instruction.

14. The electronic device of claim 12, wherein the one or more processors are configured to control the one or more PIM PEs in at least a portion of the memory to perform the PIM operation and restrict access to the at least portion of the memory by an arbitrary instruction, also included in the instruction set, while the one or more PIM PEs are performing the PIM operation.

15. The electronic device of claim 12, wherein the one or more processors are further configured to, in response to a determination that the input data is firstly arranged not according to the characteristics of the target operation, rearrange the input data according to the characteristic of the PIM operation using a load/store instruction to access the memory.

16. The electronic device of claim 12, wherein the instruction set comprises the PIM operation execution instruction.

17. The electronic device of claim 12, wherein the one or more processors are further configured to rearrange, according to a predetermined arrangement compatible with one or more other components of the accelerator, a result of the PIM operation using a load/store instruction to access the memory.

18. The electronic device of claim 12,
wherein the status of the PIM operation comprises status information that the PIM operation is being performed when the PIM operation is being performed, and status information that the PIM operation has terminated when the PIM operation has terminated, and
wherein the status information that the PIM operation has been terminated comprises status information regarding whether the PIM operation was successful.

19. The electronic device of claim 18, wherein the one or more processors are further configured to identify the status of the PIM operation stored in the PIM operation register, and determine, based on the identified status of the PIM operation, whether a result obtained through the PIM operation is to be excluded or whether a post-processing is necessary for the result obtained through the PIM operation.

20. An electronic device, comprising:
an accelerator comprising:
  a memory including processing-in-memory (PIM) processing elements (PEs) respectively configured to perform a PIM operation;
  a PIM operation register; and
  one or more processors, separate from the memory, configured to:
    in response to a result of a performed determination, between the PIM operation and a non-PIM operation, being that a target operation included in an instruction set is the PIM operation:
      obtain information regarding a PIM operation type of the target operation based on a performed determination that input data, for use in the target operation, is arranged according to a characteristic of the target operation; and
      control, using a PIM operation execution instruction, one or more of the PIM PEs to perform the target operation using the arranged input data and the obtained information regarding the operation type,
  wherein the one or more processors are further configured to control a storing of a status of the PIM operation in the PIM operation register.

* * * * *